United States Patent [19]

Buddwalk

[11] Patent Number: 4,667,512

[45] Date of Patent: May 26, 1987

[54] NORMAL FORCE TRANSDUCER FOR RECEPTACLE CONTACT

[75] Inventor: John A. Buddwalk, Harrisburg, Pa.

[73] Assignee: AMP Incorporated, Harrisburg, Pa.

[21] Appl. No.: 840,246

[22] Filed: Mar. 17, 1986

[51] Int. Cl.⁴ .............................................. G01L 1/04
[52] U.S. Cl. ...................................... 73/161; 73/818; 73/852; 73/862.65
[58] Field of Search ............ 73/818, 849, 852, 862.67, 73/862.66, 862.65, 862.64, 161

[56] References Cited

U.S. PATENT DOCUMENTS 2,483,867 10/1949 Anderson et al. ..................... 73/161
4,380,171 4/1983 Smith .......................... 73/862.65 X Primary Examiner—Jerry W. Myracle
Attorney, Agent, or Firm—F. Brice Faller; David L. Smith

[57] ABSTRACT

Apparatus for measuring the normal force exerted on a pin by a receptacle contact comprises a pair of beams profiled as the pin and having inward facing deflecting surfaces defining a central space. A thin film integrated circuit bonded to one of the beams includes a pair of strain gages at each end of the deflecting surface and leads extending to solder pads remote from the probe.

7 Claims, 5 Drawing Figures

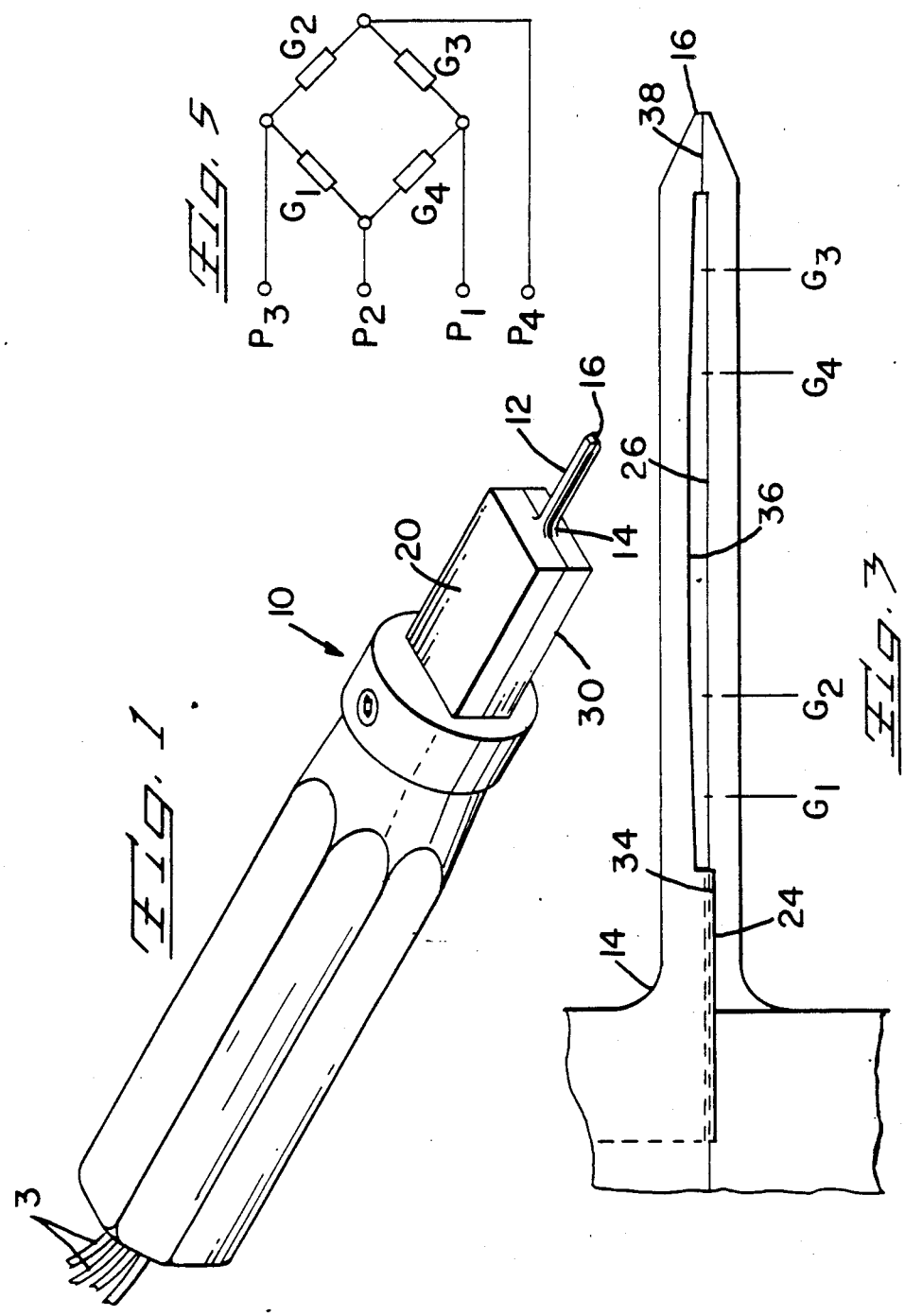

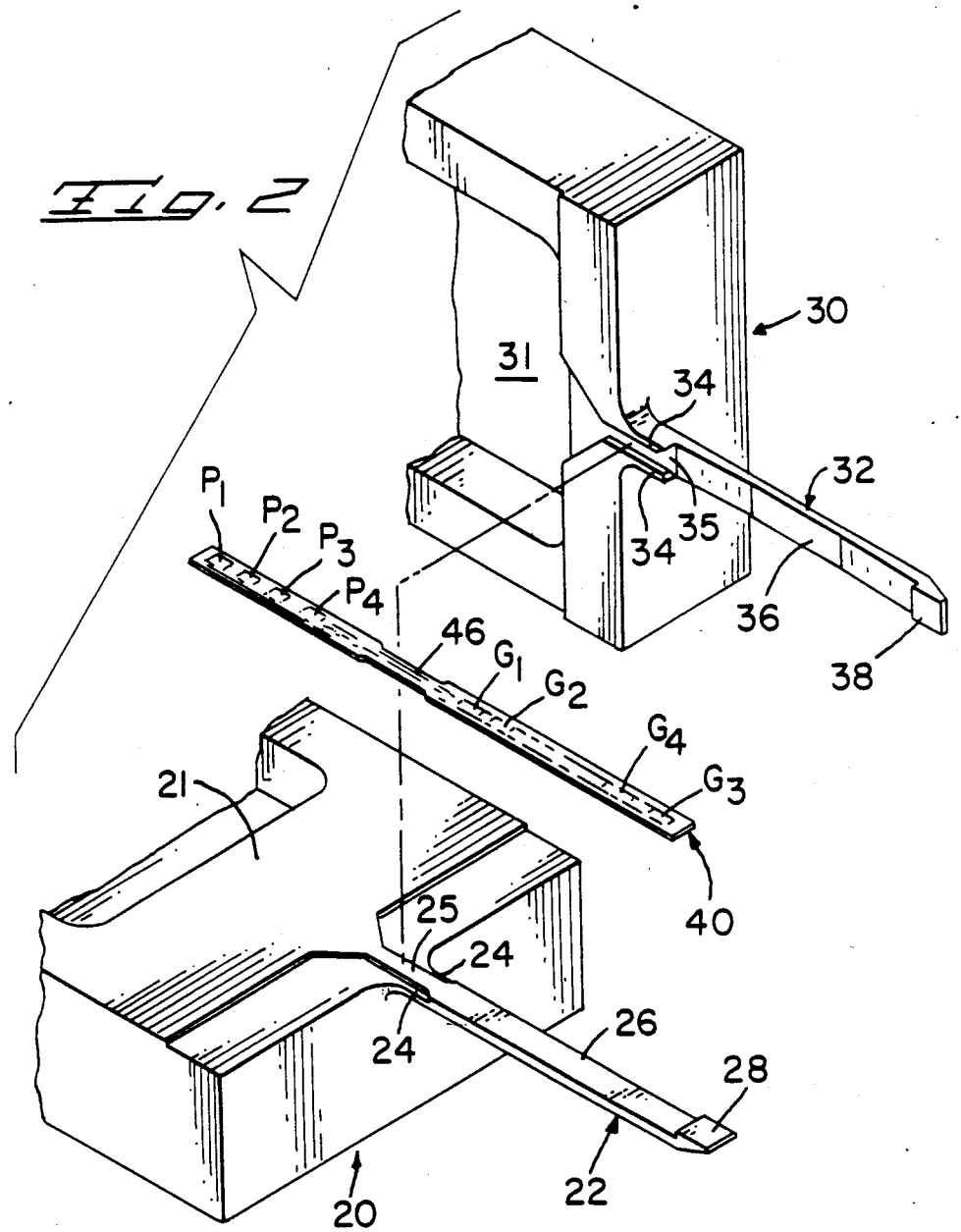

NORMAL FORCE TRANSDUCER FOR RECEPTACLE CONTACT

BACKGROUND OF THE INVENTION

The present invention relates to apparatus for measuring the contact force between a receptacle contact and a pin.

U.S. Pat. No. 4,380,171 discloses apparatus for measuring the contact force between a resilient contact in a card edge connector and a pad on a printed circuit board received therein. A blade-like probe having a base and a distal end and of like thickness as the printed circuit board comprises two members defining a central space therebetween, one of the members having a pair of parallel slots defining a fixed end beam adjacent the space. The beam has a pair of strain gages bonded thereto toward opposed ends, the gages being connected by leads which further extend into the base for connection to current supply means and galvanometer means remote from the probe. The circuit forms a balanced bridge when the beam is not loaded, an unbalanced bridge resulting when the probe is inserted in a card edge connector and the beam is loaded by the resilient contact. The contact force may thus be determined by well known principles as outlined in Perry, C. C., The Strain Gage Primer (McGraw-Hill, 1962) at pp. 55-73.

The above described strain transducer introduces the fixed beam principle which enables non-destructive testing of contacts in a card edge connector, but cannot readily be adapted for receptacle contacts which receive 0.025 in. square posts. Such contacts, marketed by AMP Incorporated in its AMPMODU connector line, are disclosed in U.S. Pat. No. 4,343,085. It would accordingly be desirable to have a measuring device with a probe profiled as a pin or the like, particularly a 0.025 in. square post.

SUMMARY OF THE INVENTION

According to the invention, a device for measuring the contact force of a receptacle contact employs a probe having a base and a distal end and comprising a plurality of beams collectively profiled as a pin or the like. Each has a first support surface toward the base, a second support surface toward the distal end, and a deflecting surface therebetween. The deflecting surfaces define a central space wherein an elongate etched circuit is bonded to the deflecting surface of one of the beams. The circuit includes first and second pairs of strain gages bonded to the deflecting surface toward respective first and second support surfaces and integral lead means extending beyond the first pair oppositely from the second pair for connection to current supply means remote from the probe.

The use of a thin film integrated circuit, by virtue of using photofabrication and etching techniques, enables fabrication of circuitry dimensioned to fit within a pin sized probe. This eliminates solder joints, which would tend to stiffen the beam in an irregular fashion causing non-linear gage output.

Thin film strain gages are well known, many being catalogued by Measurements Group, Inc., of Raleigh, N.C. However, it was not previously known to manufacture an elongate thin film integrated circuit incorporating four strain gages with leads extending to remote solder pads for completion of a Wheatstone bridge circuit. Rather, prior art strain gages are manufactured with solder pads immediately adjacent, which would not be suitable for the present application.

BRIEF DESCRIPTION OF THE DRAWINGS

FIG. 1 is a perspective of the normal force measuring device;

FIG. 2 is an exploded perspective of the probe;

FIG. 3 is a side view of the assembled probe;

FIG. 5 is a schematic view of the circuit.

DETAILED DESCRIPTION OF THE PREFERRED EMBODIMENT

Figure 4:
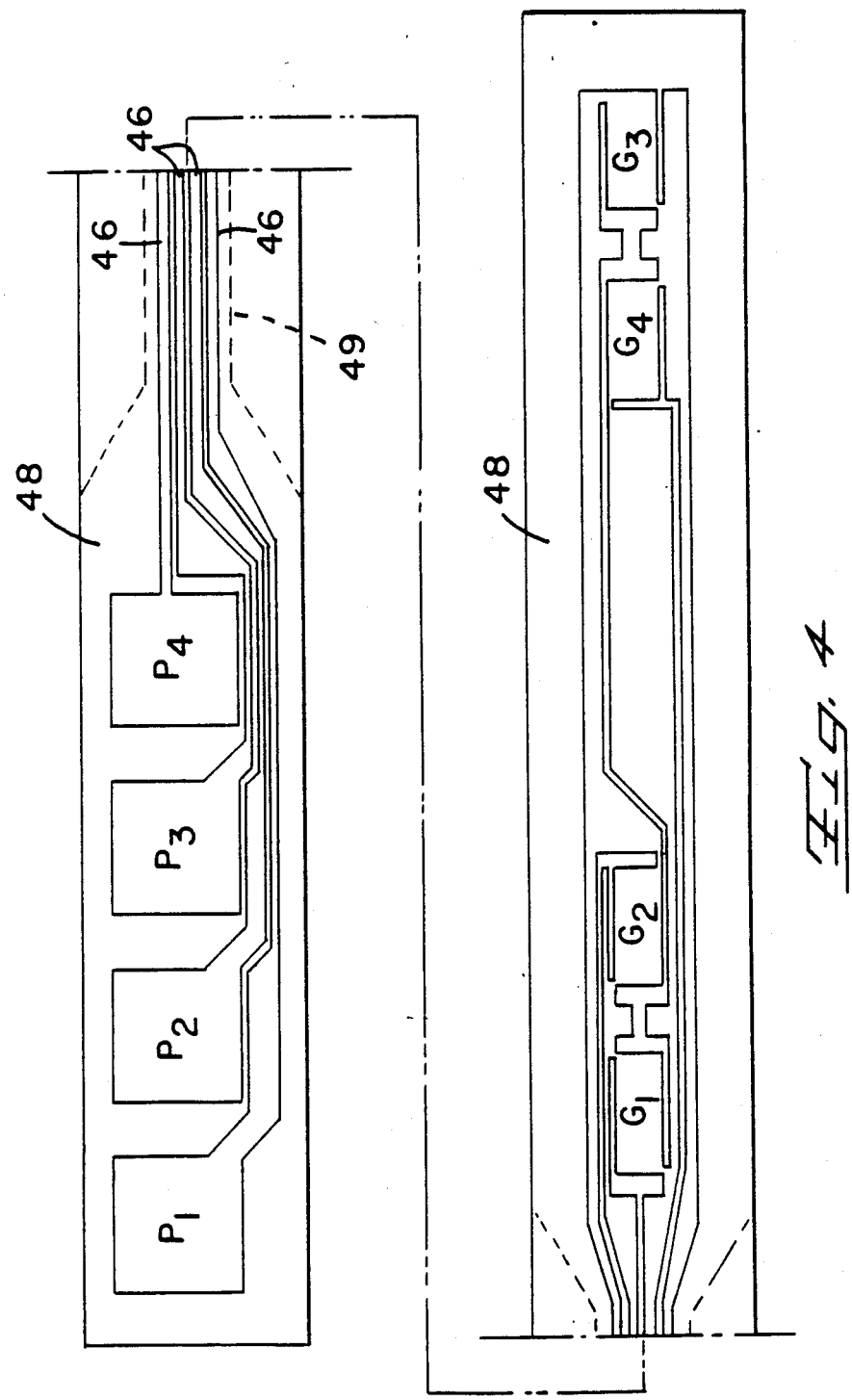
FIG. 4 is a plan view of the thin fiber integrated circuit.

Referring to FIG. 1, the measuring device 10 comprises an upper housing 20 and a lower housing 30 having a probe 12 extending therefrom, the probe having a base 14 and a distal end 16 and being profiled as a 0.025 inch square post.

Referring to FIG. 2, the probe comprises a support beam 32 and a sensing beam 22. The sensing beam 22 has a first support surface 24, a second support surface 28, and a deflecting surface 26 therebetween. The support beam 32 has a first support surface 34, a second support surface 38, and a deflecting surface 36 therebetween. An elongate thin film integrated circuit 40 received between beams 22, 32 and extending into housings 20, 30 includes a first pair of strain gages $G_1$, $G_2$ and a second pair of strain gages $G_3$, $G_4$ on a dielectric backing 48. Leads 46 extend from the gauges through neck 49 to pads $P_1$, $P_2$, $P_3$, and $P_4$ remote therefrom, the neck 49 being simply a narrow area in backing 48 where the leads 46 are closely spaced. The gages $G_1$, $G_2$ are bonded to deflecting surface 26 toward first support surface 24, while gages $G_3$, $G_4$ are bonded to surface 26 toward second support surface 28. The first support surface 24 is interrupted by a pedestal 25 which receives the neck 49 so that the leads 46 are raised above support surface 24. The pedestal 35 is coplanar with deflecting surface 26. The first support surface 34 has a channel 35 which receives the pedestal 25. The pads $P_1$, $P_2$, $P_3$, $P_4$ are received over rear surface 21 where they are soldered to wires 3 (FIG. 1) connected to outside equipment, the housings 20, 30, subsequently being sandwiched together. The housing 30 has a chamber 31 received over surface 21 to form a cavity for the solder joints on pads $P_1$, $P_2$, $P_3$, $P_4$. The beams 22, 32 are then spot welded together adjacent the first support surfaces 24, 34 and second support surfaces 28, 38.

Referring to FIG. 3, the gages $G_1$ and $G_2$ are spaced the same distance apart as gages $G_3$ and $G_4$, each pair likewise being the same distance from the adjacent support surface 24, 28, the deflecting surface 26 defining the deflecting portion of sensing beam 22. The deflecting surface 36 of the support beam 32 is recessed only sufficiently to accommodate deflection of the sensing beam 22, the surface 36 being arched to minimize its own deflection. The thickness of the support beam 32 from the deflecting surface 36 to the opposed outside surface of the beam 32 ranges from 0.0110 inch to 0.0095 inch, while the thickness of the opposed portion of the sensing beam 22 is uniform at 0.0100 inch. The outside dimension of the probe 12 across beams 22, 32 is 0.026 inch in the undeflected state. The expected deflection is about 0.001 inch, yielding an outside dimension of 0.025 inch in the deflected state. Thus when the probe 12 is inserted in a socket it will simulate a 0.025 inch square post. The first support surfaces 24, 34 extend beyond base 14 so that the beam deflection is limited to where needed, the contact point lying in the center of the deflecting portion of sensing beam 22, which is defined by recessed surface 36 on support beam 32.

Referring to FIG. 4, the thin film integrated circuit is produced by a photofabrication/etching process and comprises a nickel chromium alloy foil on a thin, glass-fiber reinforced epoxy backing. The total thickness, including a protective epoxy coating for the foil circuitry, only 0.0025 inch. The strain gages $G_1$, $G_2$, $G_3$, $G_4$ are preferably in the range of 200 to 300 ohms with a grid-to-grid resistance variation of 0.3% or less. In other words, the gages are ideally of identical resistance. Suitable gages are available from Micro-Measurements Division of Measurements Group, Inc. in its Fineline series of strain gages. The entire integrated circuit shown in FIG. 4 is likewise manufactured by Measurements Group, Inc. After manufacture, the backing 48 between the gages $G_1$, $G_2$, $G_3$, $G_4$ and pads $P_1$, $P_2$, $P_3$, $P_4$ is trimmed to form the necked-down portion 49 and the circuit is bonded to sensing beam 22. Bonding is accomplished with a two-component epoxy-phenolic adhesive such as M-Bond 600, also manufactured by Micro-Measurements Group.

FIG. 5 is a schematic of the circuitry. The solder pads $P_1$ and $P_3$ provide connection points for a battery or other current source, while the solder pads $P_2$ and $P_4$ provide connection points for a galvanometer. According to known strain gage transducer principles, the current flow in the galvanometer provides a measure of the normal force on the sensing beam 22 and is independent of load position. The gage is readily calibrated using certified weights.

The foregoing is exemplary and not intended to limit the scope of the claims which follow.

I claim:

1. A device for measuring the contact force of a receptacle contact which receives a pin or the like, said device comprising:
    a metal probe having a base and a distal end, each probe comprising a plurality of beams collectively profiled as said pin or the like, each beam having a first support surface toward said base, a second support surface toward said distal end, and a deflecting surface lying therebetween, said first surfaces being juxtaposed against each other, said second surfaces being juxtaposed against each other, said beams being separated between said ends, said deflecting surfaces defining a central space,
    an elongate thin film integrated circuit bonded to the deflecting surface of one of said beams, said circuit comprising a first pair of strain gages bonded to said deflecting surface toward said first support surface and a second pair of strain gages bonded to said recessed surface toward said second support surface, said circuit further comprising lead means connected to said strain gages and extending beyond said first pair oppositely from said second pair for remote connection to current supply means and galvanometer means remote from said probe, said circuit forming a balanced bridge when said one of said beams is not loaded, whereby an unbalanced bridge condition results from loading said one of said beams and the deflecting force may be determined.

2. A device as in claim 1 wherein one of said first support surfaces has a channel therethrough which substantially parallels the axis of said probe, said leads means being laterally spaced for reception in said channel where said lead means extends beyond said first pair of gages.

3. A device as in claim 1 wherein said integrated circuit further comprises solder pads opposite said first support surface, said lead means comprising individual leads extending to respective solder pads.

4. A device as in claim 3 wherein said solder pads are serially aligned with the axis of the probe.

5. A device as in claim 1 characterized by two beams collectively profiled to simulate a 0.025 inch square post.

6. A device as in claim 5 wherein a thin film integrated circuit is bonded to only one of said beams, the other beam having a deflection surface which is recessed to accommodate deflection of said one of said beams and is arched to limit its own deflection.

7. A device as in claim 5 wherein the dimension across the outside of the beams is slightly over 0.025 inch in the unloaded state, whereby the beams approximate a 0.025 inch square post when loaded.

* * * * *